US005384592A

United States Patent [19]
Wong

[11] Patent Number: 5,384,592
[45] Date of Patent: Jan. 24, 1995

[54] METHOD AND APPARATUS FOR TANDEM COLOR REGISTRATION CONTROL

[75] Inventor: Lam F. Wong, Fairport, N.Y.

[73] Assignee: Xerox Corporation, Stamford, Conn.

[21] Appl. No.: 976,847

[22] Filed: Nov. 16, 1992

[51] Int. Cl.⁶ .......... G01D 15/06
[52] U.S. Cl. .......... 346/157
[58] Field of Search .......... 346/157

[56] References Cited

U.S. PATENT DOCUMENTS

| | | | |
|---|---|---|---|
| 3,838,919 | 10/1974 | Takahashi | 355/327 |
| 4,403,848 | 9/1983 | Snelling | 355/327 |
| 4,485,982 | 12/1984 | St. John et al. | 242/57.1 |
| 4,569,584 | 2/1986 | St. John et al. | 141/73 |
| 4,804,979 | 2/1989 | Kamas et al. | 346/157 |
| 4,837,636 | 6/1989 | Daniele et al. | 358/300 |
| 4,887,102 | 12/1989 | Yoshikawa et al. | 346/157 |
| 4,903,067 | 2/1990 | Murayama et al. | 346/160 |
| 4,912,491 | 3/1990 | Hoshino et al. | 346/160 |
| 4,961,089 | 10/1990 | Jamzadeh | 355/207 |
| 4,962,312 | 10/1990 | Matuura et al. | 250/236 |
| 4,963,899 | 10/1990 | Resch, III | 346/157 |
| 4,965,597 | 10/1990 | Ohigashi et al. | 346/157 |
| 5,016,062 | 5/1991 | Rapkin | 355/327 |
| 5,025,269 | 6/1991 | Saeki et al. | 346/108 |
| 5,072,244 | 12/1991 | Aoki et al. | 346/160 |
| 5,093,674 | 3/1992 | Storlie | 346/108 |
| 5,115,256 | 5/1992 | Miyagi et al. | 346/108 |
| 5,227,815 | 7/1993 | Dastin et al. | 346/157 X |
| 5,260,725 | 11/1993 | Hammond | 346/157 |
| 5,278,625 | 1/1994 | Charnitski et al. | 355/326 R |

*Primary Examiner*—Benjamin R. Fuller
*Assistant Examiner*—Randy W. Gibson
*Attorney, Agent, or Firm*—Finnegan, Henderson, Farabow, Garrett & Dunner

[57] ABSTRACT

An image forming apparatus having an image transfer belt for transferring a plurality of images, a first image forming station for forming a first registration indicia on the image transfer belt, and a second image forming station for forming a second registration indicia on the image transfer means. The image forming apparatus further includes a registration indicia sensor belt for sensing positioning of the first and second registration indicia, a misregistration determining portion for determining misregistration of the second image forming station based upon the positioning of the second registration indicia relative to the first registration indicia, and a correcting portion for correcting the misregistration of the second image forming station as determined by the misregistration determining portion.

48 Claims, 6 Drawing Sheets

800

METHOD AND APPARATUS FOR TANDEM COLOR REGISTRATION CONTROL

BACKGROUND OF THE INVENTION

1. Field of the Invention

This invention relates to an apparatus and method for registering superimposed images in an image forming apparatus. In particular, this invention relates to an apparatus and method for registering a plurality of component images formed by a tandem color image forming apparatus.

2. Discussion of the Related Art

In an image forming apparatus in which a plurality of separately formed component images are required to be superimposed upon one another, such as a color copier, it is extremely important to ensure that the proper adjustments are made to the apparatus so that the component images are precisely registered and superimposed.

Misregistration is a system level composite error in the relative positioning of one component image with respect to the other component images and resulting in the component images not being properly superimposed. Misregistration may be broken down into several types including lateral direction offset, process direction offset, skew, lateral magnification, and bow. Any of these types of misregistration may be present in any instant of system operation.

In a tandem image forming apparatus; e.g., one having a plurality of developing stations positioned along an intermediate or transport belt, there are several possible sources of misregistration. First, there may be lateral movement or stretching of the intermediate belt relative to the developing stations resulting in lateral or directional mispositioning of the component images. Second, any of the plurality of optical elements in an image beam forming portion of the apparatus may become loose or be improperly adjusted, thus resulting in the occurrence of any or all of the above mentioned types of misregistration. Third, the component image forming stations may not be properly synchronized. Fourth, a photoreceptor drum in a component image forming station may not be properly positioned with respect to the image forming optics (commonly referred to as drum runout), causing a lateral magnification error. Fifth, the intermediate belt may be conical and cause a transport skew on the image. Sixth, a photoreceptor drum may be skewed with respect to the intermediate belt and the other photoreceptor drums to cause a skewed component image.

Any of the types of misregistration may be caused by more than one of the mentioned causes of misregistration, and any of the mentioned causes of misregistration may be responsible for causing more than one component of misregistration. Therefore, the prior attempts to correct one type of misregistration by controlling one of the causes of that type of misregistration will not necessarily eliminate that type of misregistration from occurring.

Extensive efforts have been made in attempts to eliminate lateral offset. One of the causes of lateral offset is lateral shifting of the intermediate belt. Thus, an approach taken to solve this problem has been to detect and compensate for lateral shifting of the belt. However, if any of a plurality of optical elements in the image beam forming portion of the apparatus are loose or not adjusted properly, the apparatus will exhibit lateral offset.

In U.S. Pat. No. 4,912,491, issued to Osamu Hoshino et al., a system-wide approach to avoiding misregistration is described in which each of the component image forming stations forms registration indicia which are superimposed upon one another on a transparent strip formed in an intermediate belt. A sensor is used to detect the positions of the registration indicia. By comparing the detected positions with predetermined target positions, it can be determined whether a misregistration error is present. A problem in using the approach taught in this U.S. Patent, is that the approach is very dependent upon the intermediate belt travelling at a constant speed. For example, if the belt speed has decreased due to stretching or slipping of the belt, the predetermined target positions for the registration marks would not coincide with the proper actual positions of the registration marks. Although it is conceivable that the belt speed could be detected and adjustments could be made to compensate for variations in the belt speed, such an approach is not practical because it is very difficult to detect the DC velocity of the belt to the degree of precision necessary for properly registering images.

A further problem arises because the registration marks formed on the belt are positioned outside the image forming zone, making it difficult to reduce the effects of composite bow error introduced by each of the image forming stations.

SUMMARY OF THE INVENTION

The present invention has been made in view of the above circumstances and has as an object the provision of a method and apparatus for tandem color registration control which enables accurate detection and correction of system level misregistration without the need to detect the DC velocity of the intermediate or transport belt.

A further object of the present invention is to reduce the effects of composite bow errors introduced into a superimposed image.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the image forming apparatus of this invention comprises image transfer means for transferring a plurality of images, first image forming means for forming a first registration indicia on the image transfer means, second image forming means for forming a second registration indicia on the image transfer means, registration indicia sensing means for sensing positioning of the first and second registration indicia, misregistration determining means for determining misregistration of the second image forming means based upon the positioning of the second registration indicia relative to the first registration indicia, and correcting means for correcting the misregistration of the second image forming means as determined by the misregistration determining means.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings.

DETAILED DESCRIPTION OF THE PREFERRED EMBODIMENTS

Figure 1:
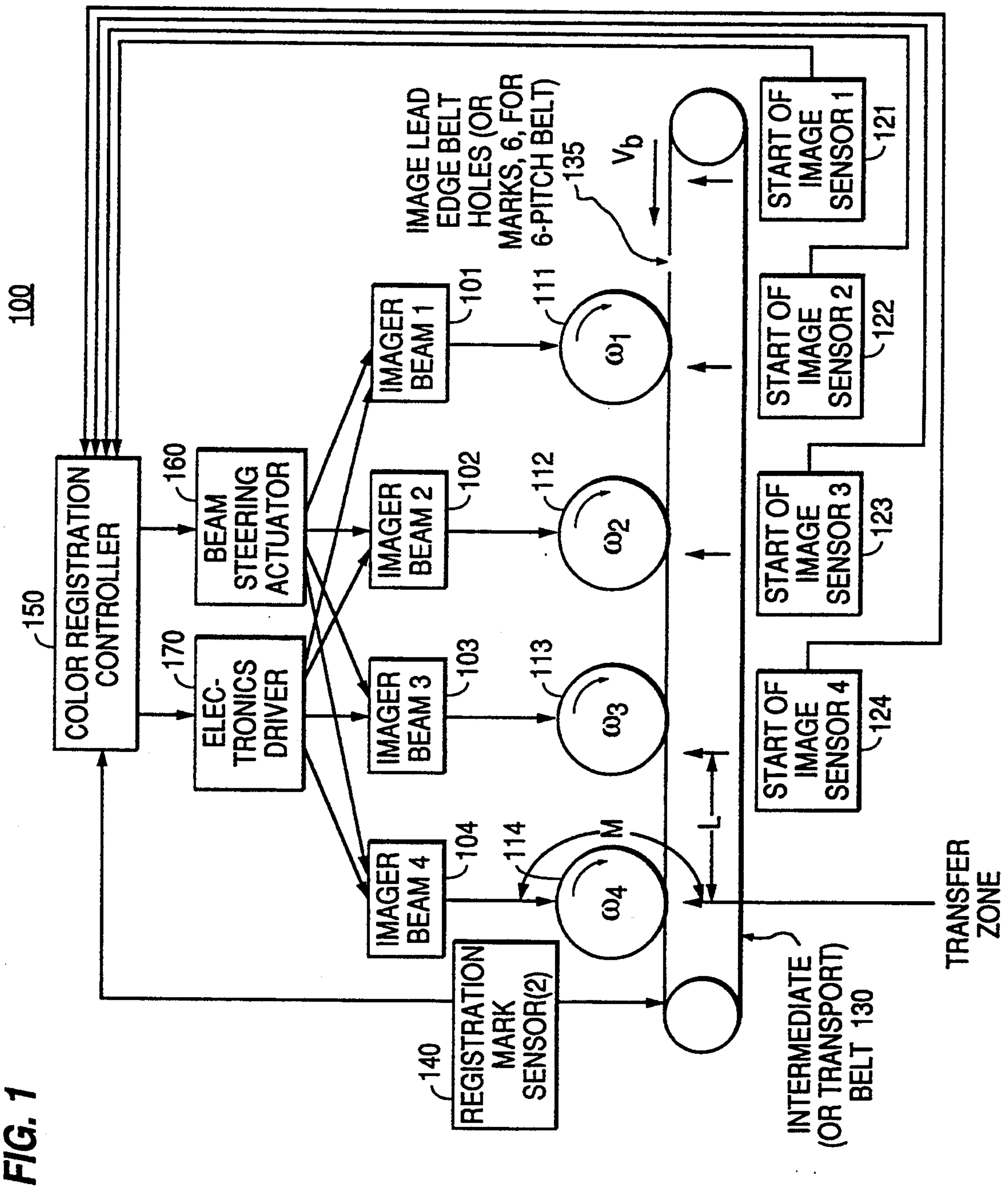
FIG. 1 is a schematic view of a first embodiment of an image forming apparatus employing the registration correcting scheme of the present invention.

A first embodiment of an image forming apparatus employing the registration correcting scheme of the present invention is shown in FIG. 1 and designated generally by the reference numeral 100. The image forming apparatus 100 shown in FIG. 1 includes four image forming means each of which include a photoreceptor drum 111, 112, 113, and 114, and an image beam providing means 101, 102, 103, and 104 for providing an image beam which forms a latent electrostatic image on the photoreceptor drum. As will be further described with respect to alternative embodiments, the image forming means may be any type of image forming device known to those skilled in the art. In the first embodiment, the image forming means comprises an image beam providing means such as a ROS imager system.

Image forming means, as described herein, may also include developing means (not shown) for developing the latent image to form a toner image on the photoreceptor drum.

Image forming apparatus 100 further includes a belt 130 which may operate as either an intermediate belt or a transport belt. If used as an intermediate belt, belt 130 receives the toner images from each of the image forming means and transfers the images onto a recording sheet. Alternatively, if used as a transport belt, belt 130 successively transports a recording sheet to each image forming means where a developed toner image is transferred onto the recording sheet.

Belt 130 may include image lead belt holes 135 which are provided so that the completion of a rotation of belt 130 may be detected. It should be noted that markings on the belt 130 could be used in place of the image lead belt holes 135. By detecting each completed rotation of belt 130, the velocity average $V_b$ of the belt may be approximated.

Image forming apparatus 100 further includes start of image (SOI) sensors 121, 122, 123, and 124 which are positioned along belt 130 upstream of an associated image forming means. SOI sensors 121, 122, 123, and 124 detect the passage of the image lead edge belt holes 135 as belt 130 moves relative to these SOI sensors. Upon detecting an image lead edge hole 135, the SOI sensors send a hole detection signal to color registration controller 150 to trigger the start of image formation.

When color registration controller 150 receives a hole detection signal, color registration controller 150 signals the electronics driver 170 to begin transmitting image drive signals to the image forming means associated with the SOI sensor which sent the hole detection signal. Thus, in this manner, images formed by the plurality of image forming means, may be superimposed.

In the embodiment shown in FIG. 1, four photoreceptor drums 111, 112, 113, and 114 are shown which rotate at rotational velocities $\omega_1$, $\omega_2$, $\omega_3$, and $\omega_4$, respectively. For proper operation, the rotational velocities of the photoreceptor drums 111, 112, 113, and 114 should be equal (i.e., $\omega_1=\omega_2=\omega_3=\omega_4$). Additionally, since the images transferred to intermediate belt 130 are to be superimposed upon each other, the time it takes for belt 130 to travel distance L, which is the distance between the point along belt 130 at which the image is transferred from the photoreceptor drum and the point along belt 130 at which a start of image sensor 121, 122, 123, or 124 is positioned, should be equal to the time it takes the photoreceptor drum to rotate distance M, which is the distance between a point on the photoreceptor drum at which the image beam impinges and a point on the photoreceptor drum at which the image is transferred to belt 130. Therefore, the velocity $V_b$ of belt 130 must be proportional to a large extent to the rotational velocities of the photoreceptor drums 111, 112, 113, and 114 (i.e., $V_b \alpha \omega_1=\omega_2=\omega_3=\omega_4$). If these conditions are not substantially satisfied, the image transferred to belt 130 will have excessive smear.

Image forming apparatus 100 further includes a registration indicia sensing means including a pair of registration mark sensors 140 each positioned on opposite sides of belt 130. Registration mark sensors 140 are preferably photonic (light intensity sensitive) sensors, but may also be CCD array sensors, or the like. Registration mark sensors 140 detect the positions of registration marks formed on intermediate belt that pass by a fixed reference point of each sensor. Upon detecting the position of a registration mark, registration mark sensors 140 send registration mark position data to the misregistration determining means (color registration controller 150) which determines whether a misregistration error has occurred. If misregistration determining means determines that a misregistration error has occurred, it sends the appropriate signals to electronics driver 170 and beam steering actuator 160 of the image forming means in order to take the appropriate action to correct the misregistration error. The operation of the misregistration determining means will be described in more detail below, but the manner in which the registration indicia are formed on belt 130, and the manner in which the position of the registration indicia is detected by the registration indicia sensing means will be described first.

The registration indicia is formed on belt 130 by each of the respective image forming means in a predetermined manner. In particular, color registration controller 150 initiates the registration process on a periodic basis during machine warm-up, after a jam clearance, or whenever directed by a user.

To initiate the registration process, color registration controller 150 sends a registration-indicia image signal to the image forming means which forms the registration indicia on belt 130 that will serve as a reference in determining misregistration of images formed by the other image forming means. In the example shown in FIG. 2, the reference registration indicia comprises two black registration marks 11 and 12 which are formed by the first image forming means (101, 111) shown in FIG. 1. Color registration controller 150 then continues to transmit registration-indicia image signals to the first image forming means such that three more sets of black registration marks 31 and 32, 51 and 52, and 71 and 72 are formed on belt 130 equal distances apart from one another.

Next, color registration controller 150 sends a registration-indicia image signal to the next downstream image forming means, which, in the present example, is second image forming means (102, 112) shown in FIG. 1. In the example shown in FIG. 2, second image forming means forms a pair of yellow registration marks 21 and 22 on belt 130 in response to the registration-indicia image signal. Color registration controller 150 delays sending the registration-indicia image signal to the second image forming means such that yellow registration marks 21 and 22 are formed on belt 130 equally spaced between the first pair of black registration marks 11 and 12 and the second pair of black registration marks 31 and 32.

Similarly, color registration controller 150 preferably causes the third image forming means to form magenta registration marks 41 and 42 equally spaced between the second pair of black registration marks 31 and 32 and the third pair of black registration marks 51 and 52, and causes the fourth image forming means to form cyan registration marks 61 and 62 equally spaced between the third pair of black registration marks 51 and 52 and the fourth pair of black registration marks 71 and 72.

When no registration errors are present, the registration marks will be formed on intermediate belt 130 such that lines drawn between the geometric centroid positions of the pairs of registration marks forming the registration indicia, are ideally parallel to each other and are ideally perpendicular to the direction of belt travel. However, it should be noted that such lines drawn between centroid positions of the pairs of registration marks forming the registration indicia, do not necessarily have to be parallel to each other and do not necessarily have to be perpendicular to the direction of belt travel. Additionally, the centroid positions of subsequently formed registration marks on both the inboard and outboard positions on belt 130 should be aligned in the direction of belt travel. For reasons that will be explained below, it is preferable that the distance "s" between the registration marks that form pairs should be approximately 0.707 w (where w is the width of the imaging zone), and the distance between the centroids of the first and last formed registration marks should be approximately 36 mm.

The manner in which the positions of the registration marks are determined and the manner in which the geometric positions of the centroids of the registration marks will now be discussed with reference to FIGS. 3 and 4. The registration marks may be of any shape which allows the consistent detection of the x and y positions of the marks independent of the speed of belt 130 such as a chevron, for example. It is important that the registration mark comprises leading and trailing reference lines oriented perpendicular to the direction of belt travel, and at least one diagonal line between the leading and trailing reference lines. The leading and trailing reference lines are important because their detection allows the positioning of the centroid of the registration mark to be detected independent of the DC velocity of the belt. The diagonal line is important because its detection allows the lateral position of the centroid of the registration mark to be determined. The registration marks are preferably formed as two identical right triangular patches 301a and 301b having their hypotenuses opposed to each other as shown in FIG. 3.

Figure 3:
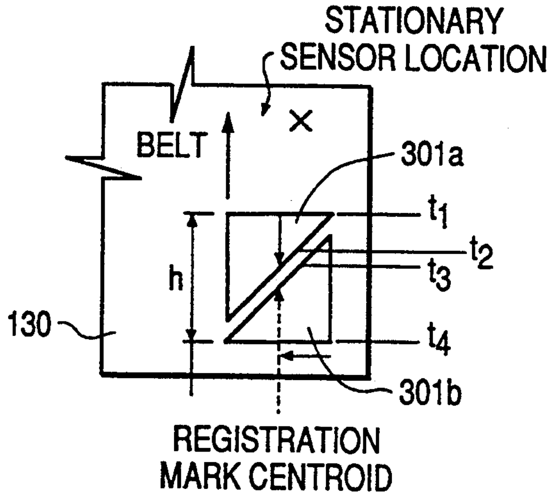
FIG. 3 is a truncated top view of the intermediate belt shown in FIG. 1 having a registration mark formed thereon in accordance with the present invention.
Figure 4:
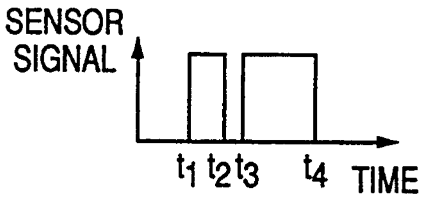
FIG. 4 is a timing diagram of a sensor signal which is output from a registration sensor upon detection of the registration mark shown in FIG. 3.

The "X" in FIG. 3 represents the stationary position of a registration mark sensor. The registration mark sensor detects the change in intensity of the light reflected from belt 130 at a single stationary point as the belt travels past the sensor. Thus, as shown by the dotted line in FIG. 3 which trails the "X", it can be seen that the registration mark sensor will detect the edges of the triangles 301a and 301b of the registration mark as it passes by the sensor. Because the relative position of the sensor is laterally offset from the centroid position of the registration mark, the sensor will output the signal shown in FIG. 4. By detecting $t_1$, $t_2$, $t_3$, and $t_4$ (where $t_1$ is the time at which the leading edge of triangle 301a is detected, $t_2$ is the time at which the hypotenuse edge of triangle 301a is detected, $t_3$ is the time at which the hypotenuse edge of triangle 301b is detected, and $t_4$ is the time at which the trailing edge of triangle 301b is detected) the lateral position x and the process position y of the centroid of the registration mark can be determined by the following equations:

$$x=h[(t_1+t_4)/2-(t_2+t_3)]/(t_4-t_1) \tag{1}$$

$$y=h[(t_1+t_4)/2-t_1]/(t_4-t_1) \tag{2}$$

where h is a predetermined width of the registration mark from the leading edge to the trailing edge. It should be noted that the lateral position x and the process position y of the centroid of the registration mark can be determined with respect to the position of the sensor. Therefore, it is clear that positioning of the registration mark sensors does not need to be precisely maintained. Also, the lateral position x and the process position y of the centroid of the registration mark can be determined regardless of the relative speed $V_b$ of belt 130.

The reason it is desirable to determine the position of the centroids of the differently colored registration marks is that detection of the centroids is not adversely effected by the spectral response characteristics of the sensors. Furthermore, the relative speed of the belt need not be detected in order to determine the lateral displacement.

Once the centroid positions for the reference black registration marks of the first registration indicia are determined, the centroid positions of the subsequent registration indicia are determined in the same manner. Then, the expected positions of the subsequent registration indicia can computed based upon the predetermined manner in which the color registration controller 150 causes each of the image forming means to form identical registration indicia on belt 130. The expected respective image forming means. As embodied herein, "misregistration correcting means" includes color registration controller 150, beam steering actuator 160, and electronics driver 170 which are shown in FIG. 1.

When a process direction misregistration error is detected as being present for one of the image forming means, color registration controller 150 signals electronics driver 170 to delay the transmittal of the start-of-image signal (SOI) to the one image forming means which produced the process direction misregistration error. When the image forming means comprises a ROS imager system, process direction registration can be synchronized to the nearest pixel by adjusting the timing of the SOI signals. The necessary delay is stored in a nonvolatile memory (NVM) which constitutes a part of color registration controller 150. If a higher degree of precision is required, color registration controller 150 additionally signals beam steering actuator 160 to make the necessary translational adjustments to the 180 degree fold mirror in the ROS imager system. The adjustments to the fold mirror are typically driven by stepper motors. Thus, in this manner, the process direction misregistration error can be eliminated and the images formed by the plurality of image forming means, may be properly registered in the process direction.

When a lateral direction and/or a lateral magnification misregistration error is detected as being present for one of the image forming means, color registration controller 150 signals electronics driver 170 to either delay or step up the transmittal of the start-of-scan (SOS) signal and the end-of-scan (EOS) signal to the one image forming means which produced the lateral direction and/or lateral magnification misregistration error, and to adjust the pixel clock frequency in the one image forming means. Thus, in this manner, the lateral direction and lateral magnification misregistration errors can be eliminated and the images formed by the plurality of image forming means, may be properly registered in the lateral direction.

When a skew misregistration error is detected as being present for one of the image forming means, color registration controller 150 signals beam steering actuator 160 to make the necessary rotational and translational adjustments to the 180 degree fold mirror in the ROS imager system. Alternatively, the necessary rotational and translational adjustments may be made by physically moving the whole ROS imager system. Thus, in this manner, the skew misregistration error can be eliminated and the images formed by the plurality of image forming means, may be properly registered.

Figure 7:
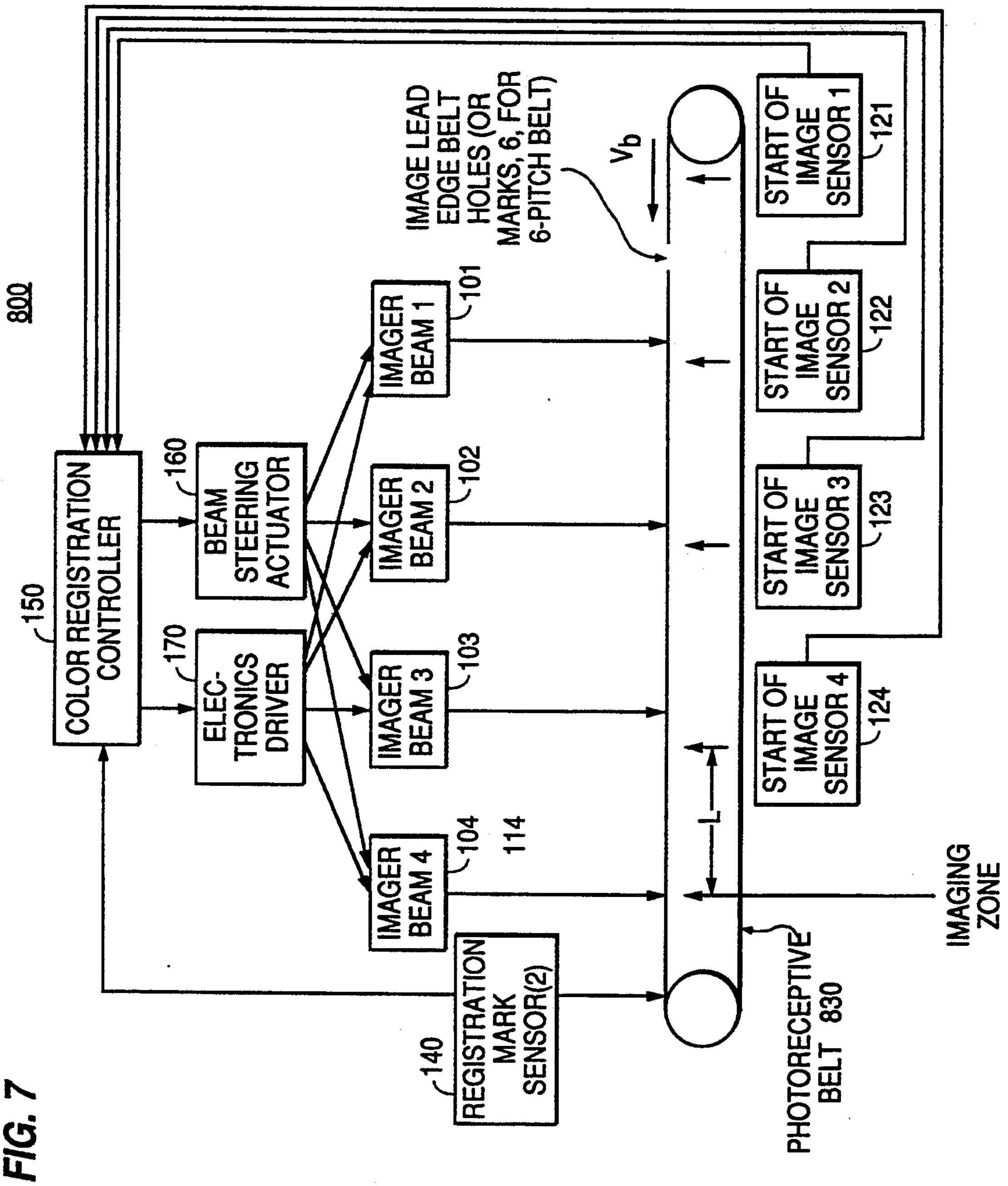
FIG. 7 is a schematic view of a second embodiment of an image forming apparatus employing the registration correcting scheme of the present invention.

A second embodiment of an image forming apparatus 800 utilizing an image-on-image process and employing the registration correcting scheme of the present invention is shown in FIG. 7. In FIG. 7, those elements which are the same as the elements shown in FIG. 1 are identified with the same reference numerals. The image forming apparatus 800 shown in FIG. 7 is similar to the image forming apparatus 100 of the first embodiment except that the image forming means form latent electrostatic images on a photoreceptive belt 830 instead of on photoreceptor drums. As with the first embodiment, the image forming means may be any type of image forming device known to those skilled in the art. In this second embodiment, the image forming means comprises an image beam providing means such as a ROS scanning system.

Image forming means, as described with respect to the second embodiment, may also include developing means (not shown) for developing the latent image on the photoreceptive belt 830 to form a toner image. In the second embodiment, the developing means for each image forming means is located along photoreceptive belt 830 downstream of the imaging zone where the latent image is formed on photoreceptive belt 830.

The operation of the second embodiment is similar to that described above with respect to the first embodiment. The major difference is that the SOI sensors 121, 122, 123, and 124 are positioned along belt 130 closer to the imaging zone of an associated image forming means so that color registration controller 150 triggers the start of image formation at a later time to compensate for the elimination of the photoreceptor drums.

Figure 8:
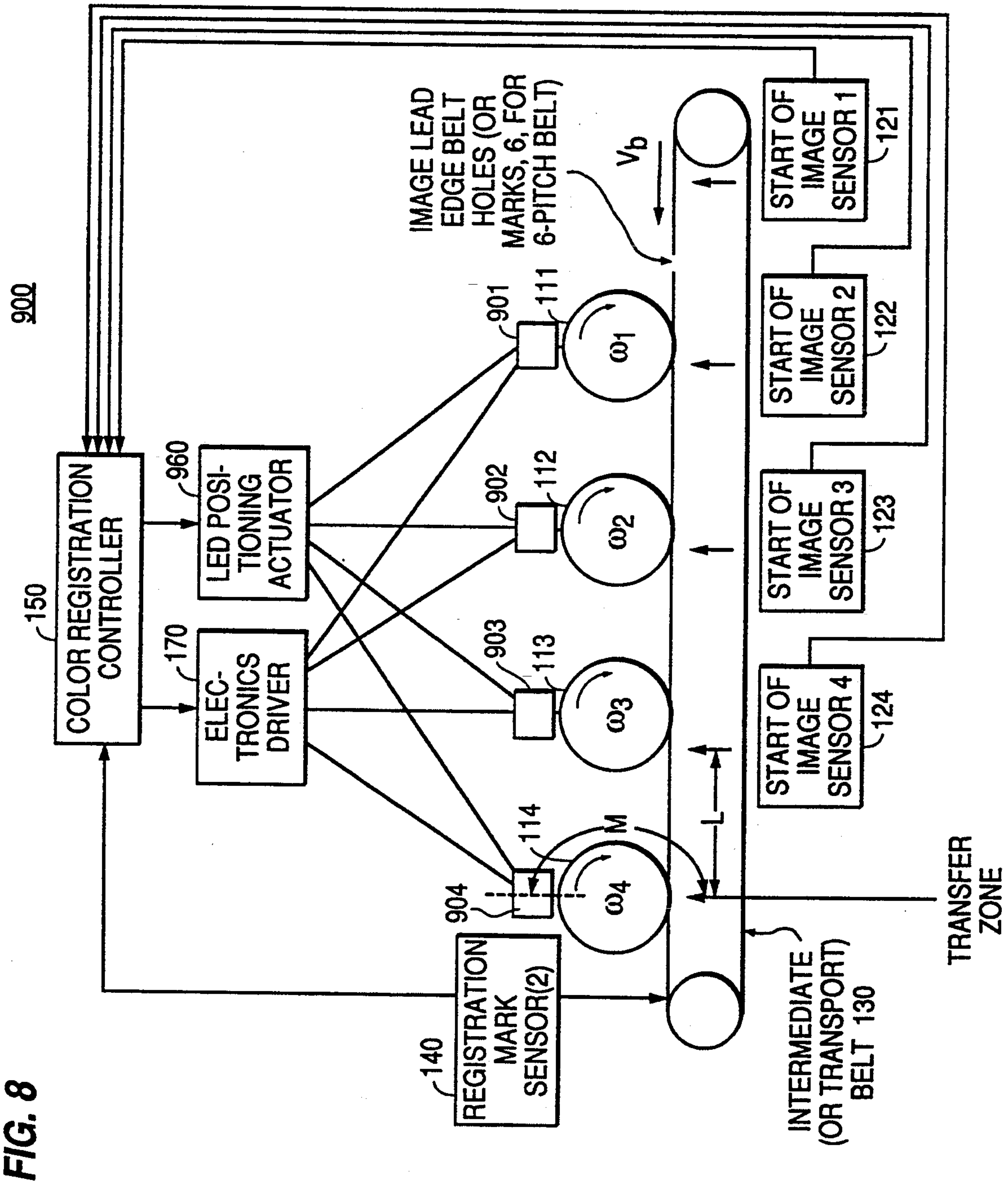
FIG. 8 is a schematic view of a third embodiment of an image forming apparatus employing the registration correcting scheme of the present invention.

A third embodiment of an image forming apparatus 900 employing the registration correcting scheme of the present invention is shown in FIG. 8. In FIG. 8, those elements which are the same as the elements shown in FIGS. 1 and 7 are identified with the same reference numerals. The image forming apparatus 900 shown in FIG. 8 is similar to the image forming apparatus 100 of the first embodiment except that the image forming means comprises light emitting diode (LED) imager arrays 901, 902, 903, and 904, and beam steering actuator 160 is replaced with LED positioning actuator 960.

Image forming means, as described with respect to the third embodiment, may also include developing means (not shown) for developing the latent image to form a toner image on the photoreceptor drum.

Like image forming apparatus 100 of the first embodiment, image forming apparatus 900 further includes a belt 130 which may operate as either an intermediate belt or a transport belt.

Operation of the third embodiment is similar to that of the first embodiment except for certain operations of the misregistration correcting means which are described below.

When a process direction misregistration error is detected as being present for one of the image forming means, color registration controller 150 signals electronics driver 170 to delay the transmittal of the first and subsequent start-of-scan (SOS) signals (i.e., the start-of-image signal) to the one image forming means which produced the process direction misregistration error. When the image forming means comprises a LED imager array, process direction registration can be synchronized exactly.

When a lateral direction and/or a lateral magnification misregistration error is detected as being present for one of the image forming means, color registration controller 150 signals LED positioning actuator 960 to adjust the lateral position and dimensions of the LED imager array to the nearest pixel which is part of the image forming means responsible for causing the misregistration error.

When a skew misregistration error is detected as being present for one of the image forming means, color registration controller 150 signals LED positioning actuator 960 to make the necessary rotational and translational adjustments to the LED imager array which is a part of the image forming means responsible for causing the misregistration error.

Figure 2:
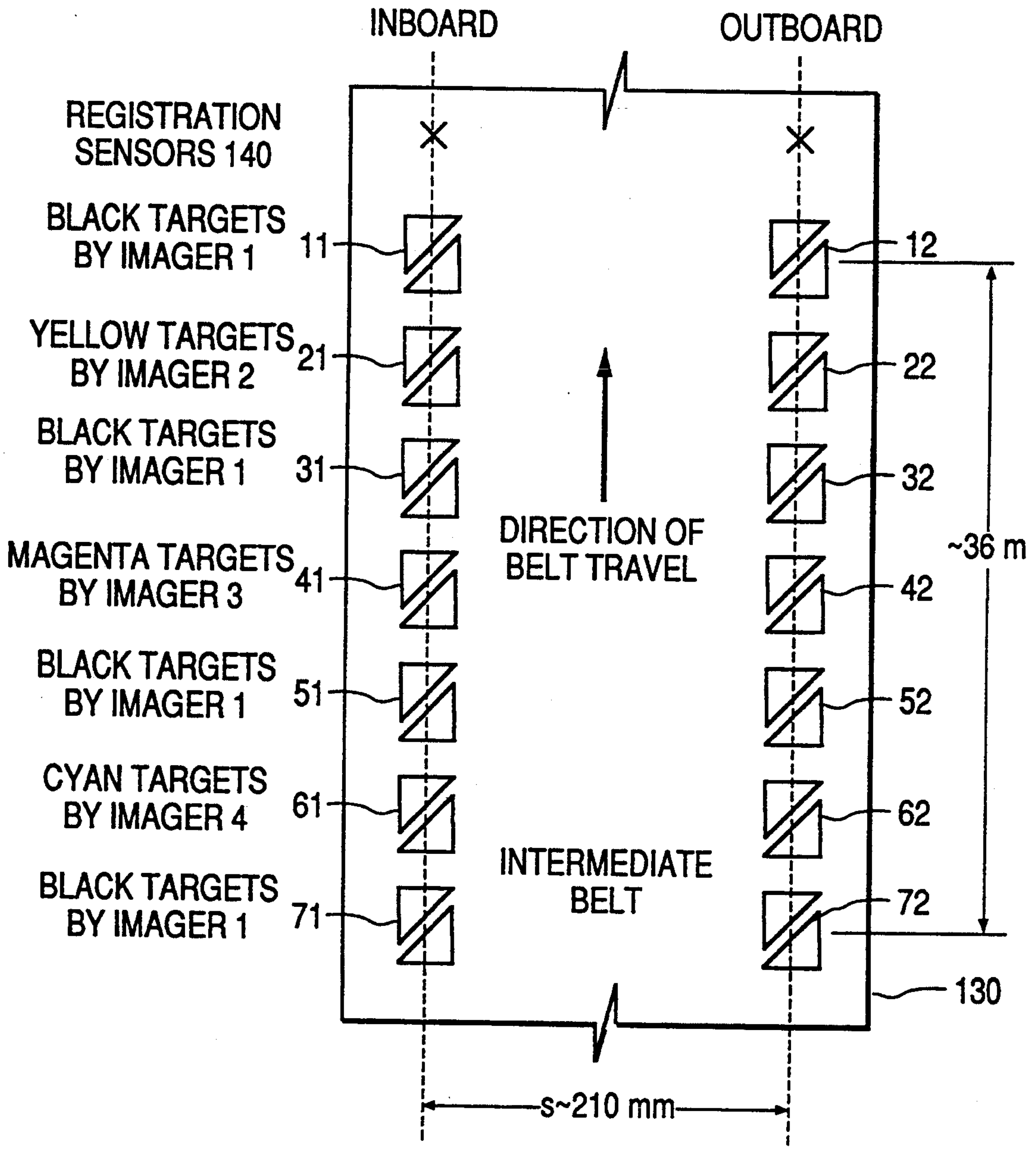
FIG. 2 is a truncated top view of the intermediate belt shown in FIG. 1 having registration indicia formed thereon in accordance with the present invention.

Although the embodiments of the present invention have been described above wherein the registration indicia are formed on an intermediate, transport, or photoreceptive belt, an additional benefit of forming the registration indicia within the image forming zone is that the registration indicia may be formed on a recordpositions of the subsequent registration indicia are shown in FIG. 2. Then, by comparing the expected positions of the centroids of subsequent registration marks with the actual positions as detected by the registration mark sensors 140, not only can misregistration errors be detected, but the specific types of misregistration errors that are present can be determined for each image forming means.

Figure 5:
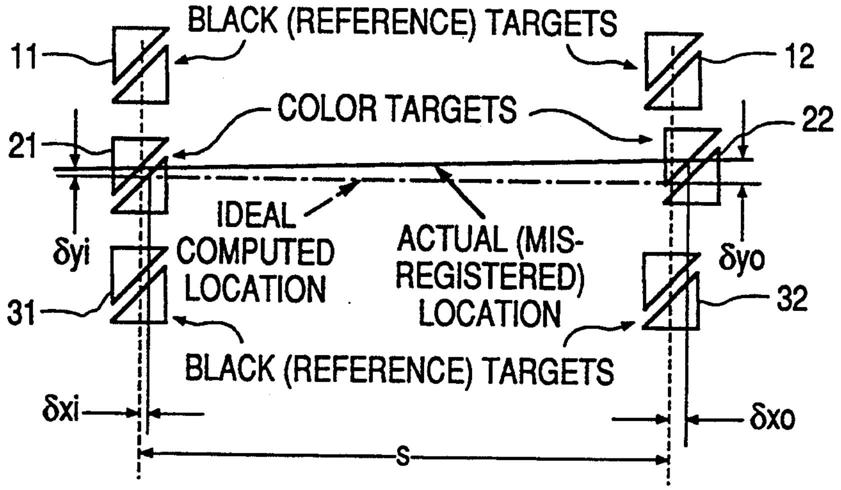
FIG. 5 is an illustration of how the present invention detects misregistration errors based upon the relative positioning of the registration indicia.

The manner in which color registration controller 150 determines what type, if any, of misregistration errors are present will now be discussed with reference to FIG. 5. First, the inboard and outboard positions $(x_{11},y_{11})$ and $(x_{12},y_{12})$ of the centroids of black registration marks 11 and 12 are determined as described above with reference to FIGS. 3 and 4. Next, the actual inboard and outboard centroid positions $(x_{21a},y_{21a})$ and $(x_{22a},y_{22a})$ of the subsequent yellow registration marks 21 and 22 are determined by registration mark sensors 140 in the same manner in which the centroid positions of the black registration marks 11 and 12 are determined. Then, the inboard and outboard positions $(x_{31},y_{31})$ and $(x_{32},y_{32})$ of the centroids of black registration marks 31 and 32 are determined. The expected inboard and outboard centroid positions $(x_{21e},y_{21e})$ and $(x_{22e},y_{22e})$ of the subsequent yellow registration marks 21 and 22 may then be computed using the following equations:

$$x_{21e}=(x_{31}+x_{11})/2 \quad (3)$$

$$y_{21e}=(y_{31}+y_{11})/2 \quad (4)$$

$$x_{22e}=(x_{32}+x_{12})/2 \quad (5)$$

$$y_{22e}=(y_{32}+y_{12})/2 \quad (6)$$

It is preferable to calculate the expected inboard and outboard centroid positions $(x_{21e},y_{21e})$ and $(x_{22e},y_{22e})$ of the registration marks using the actual positions of the preceding and subsequent black registration marks as shown in equations (3)-(6) above, because the DC velocity of belt 130 need not be determined.

Then, the lateral positional error $\delta x_{21}$ and the process positional error $\delta y_{21}$ of the inboard yellow registration mark 21 are determined, and the lateral positional error $\delta x_{22}$ and the process positional error $\delta y_{22}$ of the outboard yellow registration mark 22 are determined using the following equations.

$$\delta x_{21}=x_{21e}-x_{21a} \quad (7)$$

$$\delta y_{21}=y_{21e}-y_{21a} \quad (8)$$

$$\delta x_{22}=x_{22e}-x_{22a} \quad (9)$$

$$\delta y_{22}=y_{22e}-y_{22a} \quad (10)$$

Once the lateral and process positional errors are determined for both the inboard and outboard yellow registration marks, process direction $\Delta p_2$, lateral direction $\Delta l_2$, skew $\Delta s_2$, and lateral magnification $\Delta m_2$ misregistration errors can be computed using the equations:

$$\Delta p_2=(\delta y_{21}+\delta y_{22})/2 \quad (11)$$

$$\Delta l_2=(\delta x_{21}+\delta x_{22})/2 \quad (12)$$

$$\Delta s_2\approx(\delta y_{22}-\delta y_{21})/s \quad (13)$$

$$\Delta m_2\approx(\delta x_{22}+\delta x_{21})/s \quad (14)$$

where s is a predetermined distance between the centroids of black registration marks 11 and 12. As mentioned above, it is preferable that s is equal to 0.707 w, where w is the width of the image zone. When A4 size paper is used s will typically be set to 210 mm. The reason it is preferable to define s in this manner will be described as follows with reference to FIG. 6.

Figure 6:
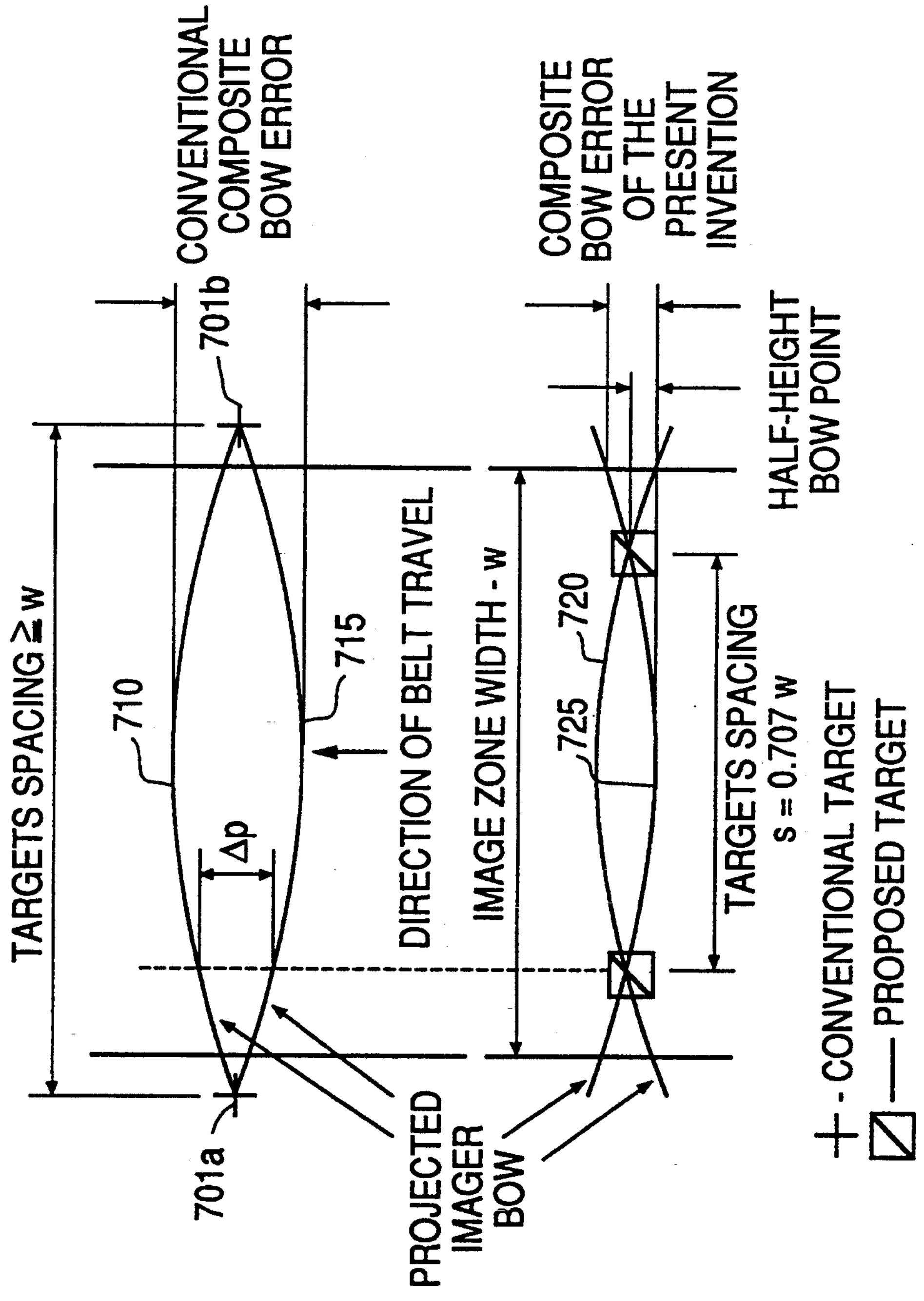
FIG. 6 is an illustration of how bow can be minimized by properly positioning the proposed targets of the present invention compared with the positioning of conventional targets.

FIG. 6 shows the worst-case effects of bow introduced by two of the image forming means for both the conventional target positioning (which is outside ($\geqq$w) the image forming zone on the belt) and the target positioning of the present invention. In FIG. 6, curved line 710 represents a severely bowed straight image line produced by one of the image forming means of a conventional system and curved line 715 represents a straight image line severely bowed in the opposite direction which is produced by another one of the image forming means of the conventional system. Without bow, lines 710 and 715 would be straight lines superimposed upon one another. Therefore, even though one would be led to believe that the images produced by the two image forming means are properly registered based on the registration of targets 701*a* and 701*b*, the images may be offset between the targets by an amount equal to twice the bow error introduced by either one of the image forming means (hereinafter referred to as composite bow error).

However, by positioning the targets closer together, as proposed in the present invention, the composite bow error can be reduced by a factor of at least two. It is apparent from the example illustrated in FIG. 6 that if closer-spaced targets were used to register curved lines 710 and 715, a process direction positional error $\Delta p$ would be detected and compensated for and the result would be that shown with lines 720 and 725.

The process described above is then repeated to determine process direction $\Delta p_4$, lateral direction $\Delta l_4$, skew $\Delta s_4$, and lateral magnification $\Delta m_4$ misregistration errors for the magenta image forming means, only the inboard and outboard positions $(x_{31},y_{31})$ and $(x_{32},y_{32})$ of the centroids of black registration marks 31 and 32 and the inboard and outboard positions $(x_{51},y_{51})$ and $(x_{52},y_{52})$ of the centroids of black registration marks 51 and 52 are used to calculate the expected inboard and outboard centroid positions $(x_{41e},y_{41e})$ and $(x_{42e},y_{42e})$ of the subsequent magenta registration marks 41 and 42.

Similarly, the process direction $\Delta p_6$, lateral direction $\Delta l_6$, skew $\Delta s_6$, and lateral magnification $\Delta m_6$ misregistration errors of the cyan image forming means, only the inboard and outboard positions $(x_{51},y_{51})$ and $(x_{52},y_{52})$ of the centroids of black registration marks 51 and 52 and the inboard and outboard positions $(x_{71},y_{71})$ and $(x_{72},y_{72})$ of the centroids of black registration marks 71 and 72 are used to calculate the expected inboard and outboard centroid positions $(x_{61e},y_{61e})$ and $(x_{62e},y_{62e})$ of the subsequent cyan registration marks 61 and 62.

The process direction, lateral direction, skew, and lateral magnification misregistration errors are system level composite errors which originate from the four imagers, the four photoreceptor drums, and the belt. There is no need to breakup the composite errors into individual error components. Beam steering and other electronics adjustments can compensate for the composite errors as a whole. Thus, once the process direction, lateral direction, skew, and lateral magnification misregistration errors are calculated, misregistration correcting means corrects the misregistration of the ing sheet. If the image forming apparatus utilizes a job cover sheet, it is preferable to form the registration indicia on the job cover sheet to avoid wasting paper.

A principle advantage of forming the registration indicia on a recording sheet is that the signal-to-noise ratio in sensing the registration indicia will be increased since the differently colored registration indicia can be formed on a white background. Also, by forming the registration indicia on a recording sheet the registration system is not as dependent on machine architecture and it can be used in all color IOTs regardless of the existence of an intermediate belt. Further, parts necessary to remove the registration indicia from the belt do not have to be employed which results in lower manufacturing costs.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image forming apparatus comprising:

image transfer means for transferring a plurality of images;

first image forming means for forming a first registration indicia on said image transfer means;

second image forming means for forming a second registration indicia on said image transfer means;

registration indicia sensing means for sensing positioning of the first and second registration indicia, said registration indicia sensing means comprising a single-element image sensor for detecting positions of geometric centroids of the first and second registration indicia with respect to a single spatially fixed reference point;

misregistration determining means for determining misregistration of said second image forming means based upon the positioning of the second registration indicia relative to the first registration indicia; and correcting means for correcting the misregistration of said second image forming means as determined by said misregistration determining means.

2. The image forming apparatus of claim 1, wherein the first and second registration indicia each include first and second registration marks each formed on a different side of an image zone on said image transfer means.

3. The image forming apparatus of claim 1, wherein the plurality of images formed on said image transfer means are positioned within an image zone on said image transfer means, and wherein the first and second registration indicia are formed within the image zone.

4. The image forming apparatus of claim 1, further comprising:

third image forming means for forming a third registration indicia on said image transfer means, wherein said registration indicia sensing means senses positioning of the third registration indicia, and said misregistration determining means determines misregistration of said third image forming means based upon the positioning of the third registration indicia relative to the first registration indicia; and correcting means for correcting the misregistration of said third image forming means as determined by said misregistration determining means.

5. The image forming apparatus of claim 4, further comprising:

fourth image forming means for forming a fourth registration indicia on said image transfer means, wherein said registration indicia sensing means senses positioning of the fourth registration indicia, and said misregistration determining means determines misregistration of said fourth image forming means based upon the positioning of the fourth registration indicia relative to the first registration indicia; and correcting means for correcting the misregistration of said fourth image forming means as determined by said misregistration determining means.

6. The image forming apparatus of claim 5, wherein the first, second, third, and fourth registration indicia each include first and second registration marks each formed on a different side of an image zone on said image transfer means.

7. An image forming apparatus comprising:

image transfer means for transferring a plurality of images;

first image forming means for forming a first registration indicia on said image transfer means;

second image forming means for forming a second registration indicia on said image transfer means;

registration indicia sensing means for sensing positioning of the first and second registration indicia;

misregistration determining means for determining misregistration of said second image forming means based upon the positioning of the second registration indicia relative to the first registration indicia; and correcting means for correcting the misregistration of said second image forming means as determined by said misregistration determining means, wherein the first and second registration indicia each define a pattern having first and second parallel lines inclined at an angle to the direction of image transport, and a leading reference line and a trailing reference line positioned respectively at opposite ends of the first and second inclined lines, and wherein said misregistration determining means includes:

means for measuring the times at which the leading reference line, the first and second inclined lines, and the trailing reference line travel past a spatially fixed reference point of said registration indicia sensing means; and computing means for computing a lateral position and a process direction position of geometric centroids of the first and second registration indicia as a function of the difference between the measured times.

8. The image forming apparatus of claim 7, wherein the leading and trailing reference lines are substantially perpendicular to the direction of image transport.

9. The image forming apparatus of claim 7, wherein said computing means computes the lateral position x and the process direction position y of the centroid of the first and second registration indicia using the following equations:

$$x=h[(t_1+t_4)/2-(t_2+t_3)]/(t_4-t_1)$$

$$y=h[(t_1+t_4)/2-t_l]/(t_4-t_1)$$

where h is a predetermined width of the first and second reference indica from the leading reference line to the trailing reference line, $t_1$ is the time at which the leading reference line travels past said spatially fixed reference point, $t_2$ is the time at which the first inclined line travels past said spatially fixed reference point, $t_3$ is the time at which the second inclined line travels past said spatially fixed reference point, and $t_4$ is the time at which the trailing reference line travels past said spatially fixed reference point.

10. The image forming apparatus of claim 1, wherein said misregistration determining means determines misregistration of said second image forming means based upon the positioning of the centroid of the second registration indicia relative to the position of the centroid of the first registration indicia.

11. The image forming apparatus of claim 1, wherein said correcting means includes means for delaying a start of image formation of a component image to be formed by one of said first and second image forming means when the misregistration determining means determines that the misregistration of said second image forming means is caused by a process direction error.

12. The image forming apparatus of claim 1, wherein said correcting means includes means for adjusting timing of a start of scan signal and an end of scan signal transmitted to said second image forming means when the misregistration determining means determines that the misregistration of said second image forming means is caused by a lateral direction error.

13. The image forming apparatus of claim 1, wherein said correcting means includes means for adjusting pixel clock frequency of said second image forming means when the misregistration determining means determines that the misregistration of said second image forming means is caused by lateral magnification errors.

14. The image forming apparatus of claim 1, wherein said second image forming means includes beam steering means for steering an image forming beam, and wherein said correcting means includes means for adjusting said beam steering means of said second image forming means when the misregistration determining means determines that the misregistration of said second image forming means is caused by a skew error.

15. An image forming apparatus comprising:

first image forming means for forming a first registration indicia on a job cover sheet;

second image forming means for forming a second registration indicia on the job cover sheet;

registration indicia sensing means for sensing positioning of the first and second registration indicia;

misregistration determining means for determining misregistration of said second image forming means based upon the positioning of the second registration indicia relative to the first registration indicia; and correcting means for correcting the misregistration of said second image forming means as determined by said misregistration determining means.

16. The image forming apparatus of claim 15, wherein the first and second registration indicia each include first and second registration marks each formed on a different side of an image zone on the job cover sheet.

17. An image forming apparatus comprising:

first image forming means for forming a first registration indicia on a recording sheet;

second image forming means for forming a second registration indicia on the recording sheet;

registration indicia sensing means for sensing positioning of the first and second registration indicia;

misregistration determining means for determining misregistration of said second image forming means based upon the positioning of the second registration indicia relative to the first registration indicia; and correcting means for correcting the misregistration of said second image forming means as determined by said misregistration determining means, wherein the first and second registration indicia each define a pattern having first and second parallel lines inclined at an angle to the direction of image transport, and a leading reference line and a trailing reference line positioned respectively at opposite ends of the first and second inclined lines, and wherein said misregistration determining means includes:

means for measuring the times at which the leading reference line, the first and second inclined lines, and the trailing reference line travel past a spatially fixed reference point of said registration indicia sensing means; and computing means for computing a lateral position and a process direction position of geometric centroids of the first and second registration indicia as a function of the difference between the measured times.

18. The image forming apparatus of claim 17, wherein the leading and trailing reference lines are substantially perpendicular to the direction of image transport.

19. The image forming apparatus of claim 17, wherein said computing means computes the lateral position x and the process direction position y of the centroid of the first and second registration indicia using the following equations:

$$x=h[(t_1+t_4)/2-(t_2+t_3)]/(t_4-t_1)$$

$$y=h[(t_1+t_4)/2-t_1]/(t_4-t_1)$$

where h is a predetermined width of the first and second reference indica from the leading reference line to the trailing reference line, $t_1$ is the time at which the leading reference line travels past said spatially fixed reference point, $t_2$ is the time at which the first inclined line travels past said spatially fixed reference point, $t_3$ is the time at which the second inclined line travels past said spatially fixed reference point, and $t_4$ is the time at which the trailing reference line travels past said spatially fixed reference point.

20. The image forming apparatus of claim 15, wherein said registration indicia sensing means senses the positions of the centroids of the first and second registration indicia, and said misregistration determining means determines misregistration of said second image forming means based upon the positioning of the centroid of the second registration indicia relative to the position of the centroid of the first registration indicia.

21. An image forming apparatus comprising:

image transfer means for transferring a plurality of images;

first image forming means for forming first and third registration indicia on said image transfer means;

second image forming means for forming a second registration indicia on said image transfer means in between the first and third registration indicia;

registration indicia sensing means for sensing positioning of the first, second, and third registration indicia;

misregistration determining means for determining misregistration of said second image forming means based upon the positioning of the second registration indicia relative to the first and third registration indicia; and correcting means for correcting the misregistration of said second image forming means as determined by said misregistration determining means.

22. The image forming apparatus of claim 21, wherein the first, second and third registration indicia each include first and second registration marks each formed on a different side of an image zone on said image transfer means.

23. The image forming apparatus of claim 22, wherein the registration marks each define a pattern having first and second parallel lines inclined at an angle to the direction of image transport, and a leading reference line and a trailing reference line positioned respectively at opposite ends of the first and second inclined lines, and wherein said misregistration determining means includes:

means for measuring the times at which the leading reference line, the first and second inclined lines, and the trailing reference line travel past a spatially fixed reference point of said registration indicia sensing means; and computing means for computing process direction, lateral direction, skew, and lateral magnification misregistration errors for said second image forming means as a function of the difference between the measured times.

24. The image forming apparatus of claim 23, wherein the leading and trailing reference lines are substantially perpendicular to the direction of image transport.

25. The image forming apparatus of claim 23, wherein said computing means includes:

actual position determining means for determining an actual lateral position and an actual process direction position of the centroid of each of the registration marks as a function of the difference between the measured times;

expected position determining means for determining expected centroid positions of the first and second registration marks of the second registration indicia;

first calculating means for calculating a lateral positional error and a process positional error of the first registration mark of the second registration indicia, and a lateral positional error and a process positional error of the second registration mark of the second registration indicia based upon a comparison of the actual and expected centroid positions of the first and second registration marks of the second reference indicia; and second calculating means for calculating process direction, lateral direction, skew, and lateral magnification misregistration errors for said second image forming means as functions of the lateral positional error and the process positional error of the first registration mark of the second registration indicia, and the lateral positional error and the process positional error of the second registration mark of the second registration indicia.

26. The image forming apparatus of claim 25, wherein said actual position determining means determines the actual lateral position x and the actual process direction position y of the centroids of the registration marks using the following equations:

$$x=h[(t_1+t_4)/2-(t_2+t_3)]/(t_4-t_1)$$

$$y=h[(t_1+t_4)/2-t_1]/(t_4-t_1)$$

where h is a predetermined width of the first and second reference indica from the leading reference line to the trailing reference line, $t_1$ is the time at which the leading reference line travels past said spatially fixed reference point, $t_2$ is the time at which the first inclined line travels past said spatially fixed reference point, $t_3$ is the time at which the second inclined line travels past said spatially fixed reference point, and $t_4$ is the time at which the trailing reference line travels past said spatially fixed reference point.

27. The image forming apparatus of claim 26, wherein said expected position determining means determines the expected centroid position $(x_{21e},y_{21e})$ of the first registration mark of the second registration indicia and the expected centroid position $(x_{22e},y_{22e})$ of the second registration mark of the second registration indicia according to the following equations:

$$x_{21e}=(x_{31}+x_{11})/2$$

$$y_{21e}=(y_{31}+y_{11})/2$$

$$x_{22e}=(x_{32}+x_{12})/2$$

$$y_{22e}=(y_{32}+y_{12})/2$$

where $(x_{11},y_{11})$ is the centroid position of the first registration mark of the first registration indicia, $(x_{12},y_{12})$ is the centroid position of the second registration mark of the first registration indicia, $(x_{31},y_{31})$ is the centroid position of the first registration mark of the third registration indicia, $(x_{32},y_{32})$ is the centroid position of the second registration mark of the third registration indicia.

28. The image forming apparatus of claim 27, wherein said first calculating means calculates the lateral positional error $\delta x_{21}$ and the process positional error $\delta y_{21}$ of the first registration mark of the second registration indicia, and the lateral positional error $\Delta x_{22}$ and the process positional error $\delta y_{22}$ of the second registration mark of the second registration indicia using the following equations:

$$\delta x_{21}=x_{21e}-x_{21a}$$

$$\delta y_{21}=y_{21e}-y_{21a}$$

$$\delta x_{22}=x_{22e}-x_{22a}$$

$$\delta y_{22}=y_{22e}-y_{22a}$$

where $(x_{21a},y_{21a})$ is an actual centroid position of the first registration mark of the second reference indicia, and $(x_{22a}, y_{22a})$ is an actual centroid position of the second registration mark of the second reference indicia.

29. The image forming apparatus of claim 28, wherein said second calculating means calculates the process direction $\Delta p_2$, lateral direction $\Delta l_2$, skew $\Delta s_2$, and lateral magnification $\Delta m_2$ misregistration errors for said second image forming means using the following equations:

$$\Delta p_2 = (\delta y_{21} + \delta y_{22})/2$$

$$\Delta l_y = (\delta x_{21} + \delta x_{22})/2$$

$$\Delta s_y \simeq (\delta y_{22} - \delta y_{21})/s$$

$$\Delta m_y \simeq (\delta x_{22} + \delta x_{21})/s$$

where s is a predetermined distance between the centroids of the first and second registration marks of the first registration indicia.

30. The image forming apparatus of claim 21, further comprising:

third image forming means for forming a fourth registration indicia on said image transfer means in between the third registration indicia and a fifth registration indicia formed by said first image forming means, wherein said registration indicia sensing means senses positioning of the fourth and fifth registration indicia, and said misregistration determining means determines misregistration of said third image forming means based upon the positioning of the fourth registration indicia relative to the third and fifth registration indicia; and correcting means for correcting the misregistration of said third image forming means as determined by said misregistration determining means.

31. The image forming apparatus of claim 30, further comprising:

fourth image forming means for forming a sixth registration indicia on said image transfer means in between the fifth registration indicia and a seventh registration indicia formed by said first image forming means, wherein said registration indicia sensing means senses positioning of the sixth and seventh registration indicia, and said misregistration determining means determines misregistration of said fourth image forming means based upon the positioning of the sixth registration indicia relative to the fifth and seventh registration indicia; and correcting means for correcting the misregistration of said fourth image forming means as determined by said misregistration determining means.

32. The image forming apparatus of claim 31, wherein the first, second, third, fourth, fifth, sixth, and seventh registration indicia each include first and second registration marks each formed on a different side of an image zone on said image transfer means.

33. An image forming apparatus comprising:

image transfer means for transferring a plurality of images which are positioned within an image zone on said image transfer means;

first image forming means for forming a first registration indicia on said image transfer means within the image zone;

second image forming means for forming a second registration indicia on said image transfer means within the image zone;

registration indicia sensing means for sensing positioning of the first and second registration indicia;

misregistration determining means for determining misregistration of said second image forming means based upon the positioning of the second registration indicia relative to the first registration indicia; and correcting means for correcting the misregistration of said second image forming means as determined by said misregistration determining means.

34. The image forming apparatus of claim 33, wherein the first and second registration indicia each include first and second registration marks each formed along different side edges of said image transfer means within the image zone.

35. The image forming apparatus of claim 34, wherein the first and second registration marks of the first registration indicia are formed a distance apart equal to 0.707 w, where w is the width of the image zone.

36. A method for registering images formed by first and second image forming stations, comprising the steps of:

forming a first registration indicia on an image transfer belt with said first image forming station;

forming a second registration indicia on said image transfer belt with said second image forming station;

sensing positions of geometric centroids of the first and second registration indicia with respect to a single spatially fixed reference point;

determining misregistration of said second image forming station based upon the positioning of the second registration indicia relative to the first registration indicia; and correcting the misregistration of said second image forming station.

37. The method of claim 36, wherein the steps of forming the first and second registration indicia each include the substep of forming first and second registration marks on different sides of an image zone on said image transfer belt.

38. The method of claim 37, further comprising the steps of:

forming a third registration indicia on said image transfer belt with a third image forming station;

sensing positioning of the third registration indicia;

determining misregistration of said third image forming station based upon the positioning of the third registration indicia relative to the first registration indicia; and correcting the misregistration of said third image forming station.

39. The method of claim 38, further comprising the steps of:

forming a fourth registration indicia on said image transfer belt with a fourth image forming station;

sensing positioning of the fourth registration indicia;

determining misregistration of said fourth image forming station based upon the positioning of the fourth registration indicia relative to the first registration indicia; and correcting the misregistration of said fourth image forming station.

40. The method of claim 39, wherein the steps of forming first, second, third, and fourth registration indicia each include the substep of forming first and second registration marks on a different sides of an image zone on said image transfer belt.

41. A method for registering images formed by first and second image forming stations, comprising the steps of:

forming a first registration indicia on an image transfer belt with said first image forming station;

forming a second registration indicia on said image transfer belt with said second image forming station;

sensing positioning of the first and second registration indicia;

determining misregistration of said second image forming station based upon the positioning of the second registration indicia relative to the first registration indicia; and correcting the misregistration of said second image forming station, wherein the steps of forming first and second registration indicia each include the substep of defining a pattern having first and second parallel lines inclined at an angle to the direction of image transport, and a leading reference line and a trailing reference line positioned respectively at opposite ends of the first and second inclined lines, and wherein the step of determining misregistration of said second image forming station includes the substeps of:

measuring the times at which the leading reference line, the first and second inclined lines, and the trailing reference line travel past a spatially fixed reference point; and computing a lateral position and a process direction position of geometric centroids of the first and second registration indicia as a function of the difference between the measured times.

42. The method of claim 41, wherein the leading and trailing reference lines are formed to be substantially perpendicular to the direction of image transport.

43. The method of claim 41, wherein in the substep of computing a lateral position and a process direction position of the centroid of the first and second registration indicia, the lateral position x and the process direction position y of the centroid of the first and second registration indicia are computed using the following equations:

$$x=h[(t_1+t_4)/2-(t_2+t_3)]/(t_4-t_1)$$

$$y=h[(t_1+t_4)/2-t_1]/(t_4-t_1)$$

where h is a predetermined width of the first and second reference indica from the leading reference line to the trailing reference line, $t_1$ is the time at which the leading reference line travels past said spatially fixed reference point, $t_2$ is the time at which the first inclined line travels past said spatially fixed reference point, $t_3$ is the time at which the second inclined line travels past said spatially fixed reference point, and $t_4$ is the time at which the trailing reference line travels past said spatially fixed reference point.

44. The method of claim 36, wherein in the step of determining misregistration of said second image forming station, misregistration of said second image forming station is determined based upon the position of the centroid of the second registration indicia relative to the position of the centroid of the first registration indicia.

45. The method of claim 36, wherein the step of correcting the misregistration of said second image forming station includes the substep of delaying a start of image formation of a component image to be formed by one of said first and second image forming station when a determination is made that the misregistration of said second image forming station is caused by a process direction error.

46. The method of claim 36, wherein the step of correcting the misregistration of said second image forming station includes the substep of adjusting timing of a start of scan signal and an end of scan signal transmitted to said second image forming station when a determination is made that the misregistration of said second image forming station is caused by a lateral direction error.

47. The method of claim 36, wherein the step of correcting the misregistration of said second image forming station includes the substep of adjusting pixel clock frequency of said second image forming station when a determination is made that the misregistration of said second image forming station is caused by lateral magnification errors.

48. The method of claim 36, wherein said second image forming station includes a beam steering device for steering an image forming beam, and wherein the step of correcting the misregistration of said second image forming station includes the substep of adjusting said beam steering device of said second image forming station when a determination is made that the misregistration of said second image forming station is caused by a skew error.

* * * * *

UNITED STATES PATENT AND TRADEMARK OFFICE
CERTIFICATE OF CORRECTION

PATENT NO. : 5,384,592
DATED : January 24, 1995
INVENTOR(S) : Lam F. Wong

It is certified that error appears in the above-identified patent and that said Letters Patent is hereby corrected as shown below:

Claim 28, col. 16, line 54, "$\Delta x_{22}$" should be --$\delta x_{22}$--.

Signed and Sealed this

Twenty-eight Day of March, 1995

Attest:

Bruce Lehman

BRUCE LEHMAN

*Attesting Officer* *Commissioner of Patents and Trademarks*